Dec. 15, 1931. J. WRIGHT 1,836,739
WHEEL FOR VEHICLES
Filed Nov. 30, 1928 3 Sheets-Sheet 1
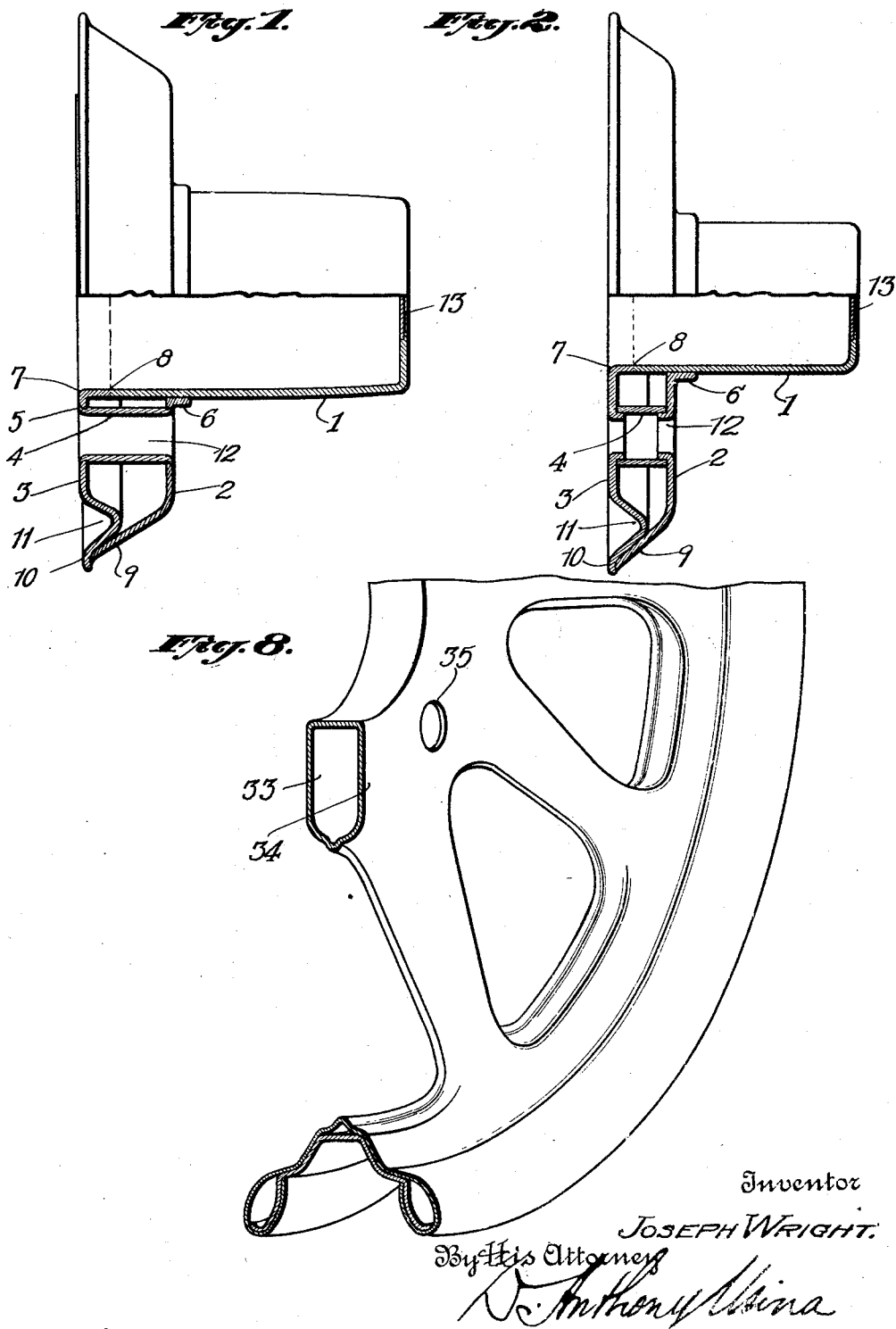
Inventor
JOSEPH WRIGHT
By His Attorney Dec. 15, 1931.   J. WRIGHT   1,836,739
WHEEL FOR VEHICLES
Filed Nov. 30, 1928   3 Sheets-Sheet 2
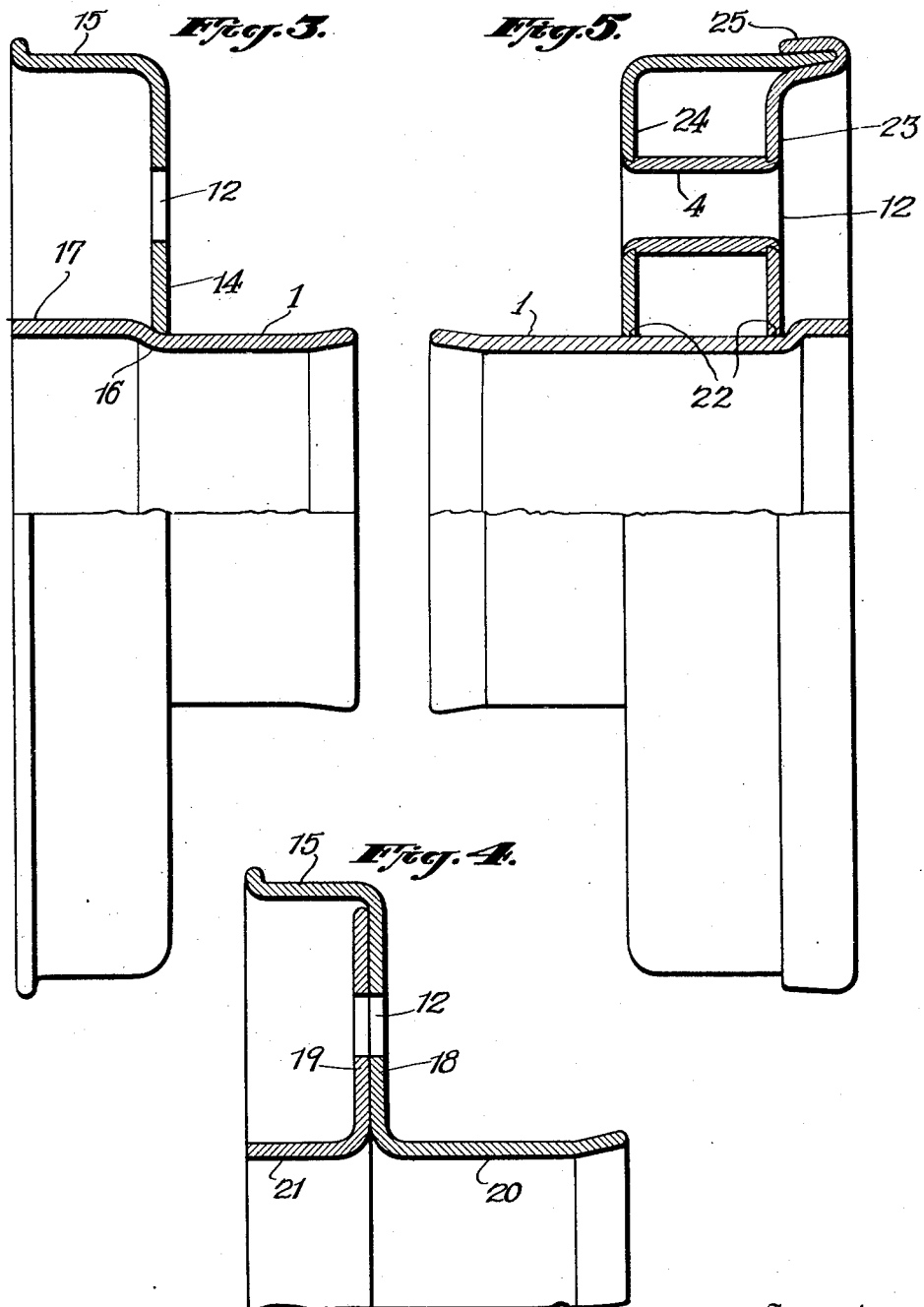
Inventor
JOSEPH WRIGHT.
By His Attorney Dec. 15, 1931.  J. WRIGHT  1,836,739
WHEEL FOR VEHICLES
Filed Nov. 30, 1928   3 Sheets-Sheet 3
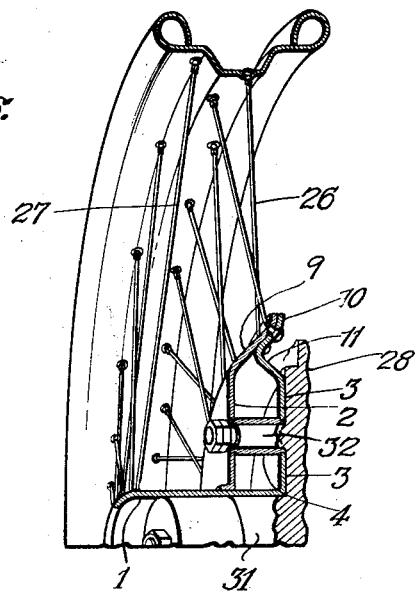
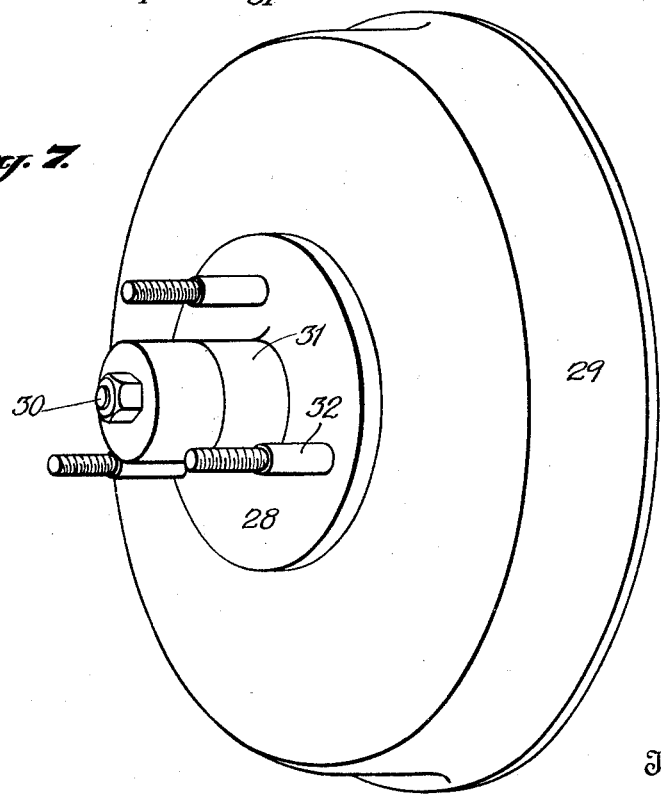
Inventor
JOSEPH WRIGHT.
By His Attorney Patented Dec. 15, 1931

1,836,739

UNITED STATES PATENT OFFICE

JOSEPH WRIGHT, OF COVENTRY, ENGLAND, ASSIGNOR TO DUNLOP RUBBER COMPANY LIMITED, OF FORT DUNLOP, BIRMINGHAM, ENGLAND

WHEEL FOR VEHICLES

Application filed November 30, 1928, Serial No. 322,613, and in Great Britain December 22, 1927.

The invention aims to provide a wire wheel which is interchangeable with artillery wheels which are bolted to the flange of a hub permanently fixed on the shaft of the wheel; the wire wheel being comparatively inexpensive. Such artillery wheels are provided with holes through which project fastening bolts or studs on the permanent hub.

My improved wire wheel has a nave provided with holes similarly located and said nave has an outer face which occupies the same position on the shank of such bolts or studs that is occupied by the outer face of the nave of the corresponding artillery wheel.

The accompanying drawings illustrate embodiments of the invention.

Figs. 1 and 2 show two side elevations each in half section;

Figs. 3, 4 and 5 show further modifications in which the invention appears;

Fig. 6 is a sectional perspective view of part of the complete wire wheel;

Fig. 7 is a perspective view of the permanent hub on the shaft of the vehicle;

Fig. 8 is a perspective view of part of an artillery wheel.

In the preferred embodiment of my invention shown in Figs. 1 and 2, the construction is characterized in three main parts and a fourth subsidiary part, namely a cylinder forming the barrel 1 of the hub shell and two annular discs 2 and 3 forming the front and rear faces of the shell respectively, one disc 3 being disposed at the extreme end of the cylinder adjacent the permanent hub flange, and the other 2 spaced away from it along the said cylinder toward the outer or free end thereof by means of sleeves 4 which may be bell mouthed as at 5 in Fig. 1 for additional security.

Both discs 2 and 3 are flanged at their inner peripheries, the outer disc 2 at 6 so as to surround and closely fit the barrel portion 1, the inner disc 3 being flanged at 7 so as to permit of joining by welding or other suitable means to the cylinder 1.

Alternatively the parts 1 and 3 may be formed in one piece, the weld or joint 8 being dispensed with.

The said discs 2 and 3 are further flanged complementarily at their respective outer peripheries 9 and 10, the flange 9 fitting closely upon the flange 10, thereby forming a double thickness of metal to act as a seat for part of the wire spokes (Fig. 6), the inner side of the flange 10 being recessed at 11 to accommodate the spoke heads. The said discs 2 and 3 are further provided with holes 12 through the spacers 4 spaced to coincide with the bolts or studs upon the permanent hub (Fig. 7).

The remaining subsidiary part consists of a hub cap 13 adapted to close the outer end of the tube 1, the cap being in the form of a disc whereof the edge is embraced by the cylinder wall, or may be integral therewith.

The various parts above mentioned may be assembled and consolidated together in any convenient manner for instance by screw engagement, by welding, by friction, by spoking and the bolts, or by any convenient combination of these things.

It will be apparent that my invention is not limited to this particular embodiment of it. For instance in another construction illustrated in Figs. 3 and 4, I utilize only two main parts consisting of a cylinder 1 for the barrel and a cupped annular disc 14 for the hub shell, the said disc being spaced the required distance from the permanent hub end (the inner end when in use) of the barrel as in Figs. 1 and 2 and flanged toward the said end at its outer periphery, the respective edges of the flange 15 and the barrel being adapted to abut against the aforesaid flange of the permanent hub. It will be apparent that the barrel may be stepped as at 16 in Fig. 3 forming an enlarged inner end 17 or otherwise formed in any convenient manner, the better for instance to position the other parts of the hub.

In a further embodiment shown in Fig. 4 I provide that the barrel as a separate part be dispensed with. Thus in a two part construction, the said parts may be two annular nave discs 18 and 19 whereof the inner flanges 20-21 form the hub shell bore. In the arrangement shown the discs 18 and 19 are provided with flanges 20 and 21 at their inner peripheries to constitute the hub barrel, the vertical part 19 of the inner or reverse disc abutting either against the back of the obverse or outer disc 18 as shown or being at the other edge of the flange 21 so as to abut against the permanent hub flange.

Alternatively, the flanging may be dispensed with and the inner peripheral edges 22 of discs 23 and 24 may constitute the hub shell bore as shown in Fig. 5. My invention further contemplates, however, the use of a suitable bore liner, as shown at 1, similar to that in Fig. 3.

Furthermore, the discs are not necessarily associated together at their outer peripheries as described when referring to Figs. 1 and 2. For instance, the edge of one may completely wrap around the edge of the other to form a flange 25, Fig. 5, which may serve as a spoking flange of triple thickness and which may be disposed between the nave faces or projecting from the side of the outer disc as illustrated. Alternatively the said nave discs may be associated together by mutual engagement with a separate bonding member.

Fig. 6 shows the wheel made with two sets of spokes; the inner spokes 26 being secured to the edge portions of the hub discs 2 and 3 and the outer spokes 27 being secured to the outer end of the barrel 1.

The permanent hub 28 (Fig. 7) carries at its inner side a brake drum 29 and is fastened on the end of a shaft 30. The hub is limited by a cylindrical projection 31 fitting within the barrel 1 or hub shell of the wire wheel. On the outer face of the permanent hub are studs 32 adapted to project through the holes 12 in the nave of the wheel and to receive clamping nuts on their threaded ends.

The artillery wheel of Fig. 8 is made of heavy sheet metal with a nave comprising an inner plate 33 and an outer plate 34 with holes 35 through them to receive studs 32 of the permanent hub. The outer plate 34 of the artillery wheel corresponds in position when applied to the permanent hub with the outer plate 2 of the wire wheel shown in Fig. 6. The artillery wheel may be made with spokes as shown, or the sheet metal may be extended in the form of discs clear to the rim. Similarly the hubs of Figs. 1 to 5 may be used with other arrangements of spokes than those illustrated. For that purpose the combination of nave and tube may constitute a commercial article in the same way as wheel hubs of other sorts. In any case it is apparent that the invention provides an economical wire wheel which is interchangeable with the artillery wheel and which occupies the same position on the permanent hub.

The combined hub shell and central tubular portion may be produced separately as a complete article of manufacture and commerce, constituting a nave which is to be used in the production of spoked wheels.

Various modifications may be made by those skilled in the art without departing from the invention as defined in the appended claims.

I claim:

1. A detachable wire spoked wheel including in combination a central tubular portion, a hollow hub shell of approximately the same width as the nave of an ordinary detachable wooden or pressed steel wheel, said hub shell extending radially outward from the tubular portion and having bolt openings therethrough parallel to the wheel axis and being composed of two spaced pieces with peripheral flanges which are brought together and superimposed to form a spoke seat of double thickness, said tubular portion projecting axially outward beyond said hub shell, a rim, and two sets of spokes having their outer ends connected to the rim, one set of spokes having their inner ends in said seat and the other set having their inner ends attached to the outer portion of the central tubular portion.

2. A detachable wire spoked wheel including in combination a central tubular portion, a hollow hub shell of approximately the same width as the nave of an ordinary detachable wooden or pressed steel wheel, said hub shell extending radially outward from the tubular portion and having bolt openings therethrough parallel to the wheel axis and being composed of two spaced pieces with peripheral flanges which are brought together and superimposed to form a spoke seat of double thickness and the inner side of the inner one of said two spaced pieces being recessed to accommodate the spoke heads, said tubular portion projecting axially outward beyond said hub shell, a rim and two sets of spokes having their outer ends connected to the rim, one set of spokes having their inner ends in said seat and the other set having their inner ends attached to the outer portion of the central tubular portion.

3. A wheel hub comprising a central tubular portion, a hollow hub shell of approximately the same width as the nave of an ordinary detachable wooden or pressed steel wheel, said hub shell extending radially outward from the tubular portion and having bolt opening therethrough parallel to the wheel axis, said tubular portion projecting axially outward beyond said hub shell, and said hub shell being composed of two spaced pieces with peripheral flanges which are brought together and superimposed to form a spoke seat of double thickness.

4. The hub of claim 3 in which the inner side of the inner one of said two spaced pieces is recessed to accommodate spoke heads.

In witness whereof, I have hereunto signed my name.

JOSEPH WRIGHT.